Nov. 29, 1966    R. B. STAVER    3,288,105
SOAP-TYPE ARTICLE INCLUDING ATTACHED HOLDER
Filed Aug. 12, 1963

ROBERT B. STAVER
INVENTOR.

United States Patent Office 3,288,105
Patented Nov. 29, 1966

3,288,105
SOAP-TYPE ARTICLE INCLUDING
ATTACHED HOLDER
Robert B. Staver, 191 Hillview Ave., Los Altos, Calif.
Filed Aug. 12, 1963, Ser. No. 301,538
6 Claims. (Cl. 118—76)

In my copending application Serial No. 804,283, filed April 6, 1959, now Patent No. 3,100,363, of which this is a continuation in part, there is described a body of material, for example a cake of soap, which is adapted to cooperate with an object being treated. The body of material is attached to a member which may be adapted to be held by the hand, said member being attached to the upper surface of said body, the opposed lower surface of this body being adapted for use in cooperation with an object being treated.

This invention relates generally to a member attached to a body of material of the type which is eroded in use, and more particularly to a member attached to a body of soap.

History of the art shows that for bodies of erodable material such as soap, which have a member attached to one surface which restricts erosion from said surface, and which have a principal, using surface located generally opposite to said surface having an attached member, which principal (lower) surface is adapted for cooperation with an object being treated, no effective means has been disclosed for maintaining or controlling the area of the using surface throughout most of the life of said material in some desired relationship to that of the original using surface, so as to achieve the maximum efficiency of utilization of said body of material for the purpose intended. Experience indicates that this is especially true where the "effective vertical height" of the body of material before initial use of said body is not less than 22½% of the maximum cross-dimension of said body. The "effective vertical height" of the body of material is defined to mean the maximum vertical height of the body of material measured from the horizontal plane of intersection of the generally downwardly tapered side surface with the bottom surface, the location of this plane being further defined hereinafter, upwardly to the average height of the top surface interface between the body of material and the attached member. Where this latter horizontal plane cannot be located precisely due to irregularity of contour, its location may be approximated by careful estimation of its probable average position. For such bodies where the "effective vertical height" of the body of material is less than 22½% of the maximum cross-dimension of said body, experience shows that the advantage gained by controlling the area of the cooperating surface of use tends to be of little practical advantage since the body is relatively thin in a vertical direction and thus is worn through before the area of the lower cooperating surface can undergo much change.

It is sometimes desirable when using such an object as hereinabove described, to be able to control within practical limits the dimensions and thereby the area of the using surface of application of said body of material throughout a substantial portion of its life. For example, this would make it possible to maintain an approximately constant area of the lower surface throughout the greater portion of the useable life of said body of material.

It is a general object of the present invention to provide generally tapering side-means for controlling the approximate area of the principal using surface of cooperation, for a body of erodable material having an attached member as described, and whose effective vertical height is not less than 22½% of the maximum cross-dimension of said body of material, in a desired relationship to the distance said material is consumed or eroded away in a direction generally normal to said principal using surface.

It is also an object of the present invention to provide generally tapering downward side-means for such an article as described above whereby the using surface of cooperation may be maintained approximately constant in area throughout most of the useful life of said erodable material.

It is a further object of this invention to improve the stability of such an article in use by maintaining a substantial area of lower surface during erosion of the body of material thus reducing any tendency to tip that would cause disengagement of the cooperating interaction or contact between the principal surface of application of the body of material and the object being treated.

The foregoing objects of the invention and other objects will become more clearly apparent from the following description when taken in conjunction with the accompanying drawing.

Referring to the drawing.

Figure 3:
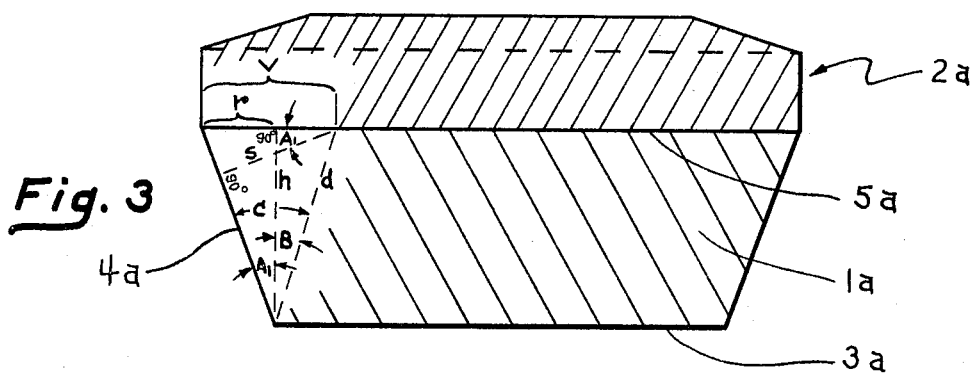

FIGURE 3 similarly shows as in FIGURE 1, in an elevation cross-section, a simple member (above) attached to a body of erodable material (below), together with a downwardly tapering side surface in accordance with the invention.

Figure 4:
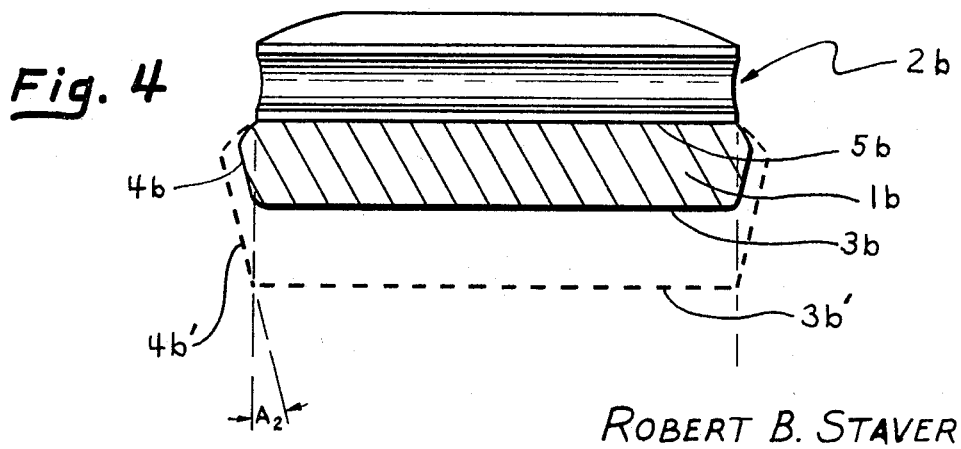

FIGURE 4 shows in partial cross-section an elevation view of a body of material with an attached member similarly as for FIGURE 3, with downwardly tapered side surfaces, a portion of said body of material having been eroded away.

Figure 1:
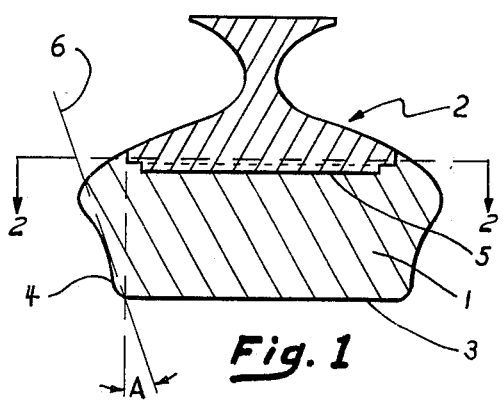
FIGURE 1 is an elevation view in cross-section showing a body of erodable material with a member attached to one side (upper) and the opposite side adapted for cooperation with an object being treated, which view depicts a side surface that generally tapers downwardly.
Figure 2:
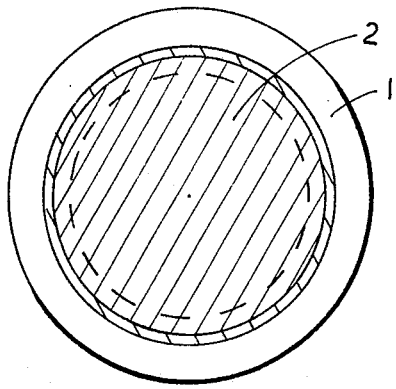
FIGURE 2 is a sectional view taken along the line 2—2 of FIGURE 1.

Referring to FIGURES 1 and 2, the body of material 1, which may for example be soap, has a member attached to its upper surface portion 5, which member is here defined to include means (portion) for holding said object by the hand and which is designated generally by the number 2, and includes a lower surface 3 adapted to operate on an object, and a side surface 4 which is generally tapered downwardly toward the lower surface 3. The taper of the side surface 4 is generally designated by the angle "A" between the approximate side-line of taper profile (shown as a dashed line 6) and the vertical, said vertical being generally normal to the lower surface 3.

FIGURE 3 is similar to FIGURE 1 and like reference numerals refer to like parts. (Suffixes are added to these numerals because of the modified configuration shown.)

Referring more particularly to FIGURE 3, specific attention is drawn to the dashed lines designated generally as "$h$" and "$s$." Here "$h$" is the vertical thickness of the body of material $1a$ measured generally normal to the lower or principal surface of cooperation $3a$ of the body with an object being treated, which material remains to be eroded away to consume completely the remaining portion of the original body of erodable material, while "s" is the distance measured generally normal to the tapered side surface, that is eroded away during use of the article up to the time that "h" becomes equal to zero. If the distances "h" and "s" are chosen so that each tends to reach zero at about the same time, and at a point of intersection with each other and the member, then the area of the principal surface of cooperation 3a will remain approximately constant through the useful life of the article. Assuming a flat upper surface 5a for purpose of explanation, such as shown in FIGURE 3, if the location of the final endpoint of "d," at the time "h" tends to reach zero length, is located inwardly from the vertical path of "h," then the area of the cooperating (lower) surface would tend to decrease with diminution of "h." In the contrary case where the final endpoint of "d" at the time "h" tends to reach zero length, is located outwardly from the vertical path of "h," the area of the lower cooperating surface would tend to increase with diminution of "h." It might be pointed out that for the general case, the location of "d" will be affected by the average rates of erosion in each of the directions "h" and "s" and also by the specific configurations of the body of material and the attached member and more particularly by the angle A. For example, for soap this erosion is not only caused by the presence of moisture on the cooperating surface but also by direct application of physical pressure and abrasion of this surface, which accelerate the rate of erosion. Erosion on the side surface 4 (and 4A) is generally less rapid than on the cooperating lower surface because relatively less rubbing and physical pressure are applied there. For any given material, an angle A may be chosen so as to increase, decrease, or to maintain approximately constant the lower surface of application (cooperation 3a) during use. However, it appears evident that in the practical application of applicant's invention, no useful purpose would ordinarily be achieved with an angle of taper (angle A) negative or substantially equal to zero. (A negative angle of taper would apparently taper upwardly rather than downwardly.) Therefore, subject invention is restricted to a substantial angle of taper inwardly and downwardly toward the lower principal surface of application.

To explain more precisely, taking the configuration shown in FIGURE 3, $e_1$ is the average erosion rate of the lower cooperating surface 3a in a direction generally normal to said surface and $e_2$ is the average erosion rate for the side surface 4a, generally either normal to this surface or generally normal to the approximate side-line of profile (designated as 6 in FIGURE 1). For the bottom surface 3a area to remain approximately constant throughout the erosion period for this body, the time for erosion of distances $h$ and $s$ must be approximately equal and their end points must approximately coincide. This in turn determines the angle "A" (shown as $A_1$ in FIGURE 3) that the side surface or general line of said profile makes with the vertical to fulfill this requirement.

This is set forth in analytic detail as follows: By definition—

$$h = e_1 t_z$$
$$s = e_2 t_z$$

where $t_z$ is the time it takes to completely consume the erodable material, and $e_1$ and $e_2$ are the average rates of erosion of $h$ and $s$ respectively (in the direction indicated by the arrows).

$$s/e_2 = h/e_1$$
$$s = h(e_2/e_1)$$

Referring to FIGURE 3, and using letter A (as the general case) for the angle $A_2$—

$$s = v \cos A$$
$$v = s/\cos A$$
$$r = h \tan A$$
$$v - r = h \tan B = s/\cos A - h \tan A$$
$$\tan B = (v-r)/h = s/(h \cos A) - \tan A$$

Substituting $$s = h(e_2/e_1)$$
$$\tan B = (h \times e_2)/(h \times e_1 \times \cos A) - \tan A = e_2/(e_1 \cos A) - \tan A = (e_2/e_1) \sec A - \tan A$$
$$B = \arctan [(e_2/e_1) \sec A - \tan A]$$
$$C = A + B = A + \arctan [(e_2/e_1) \sec A - \tan A]$$

The line "d" is determined by the angle C and designates the approximate path of the changing edge of the lower surface of application 3a of the body of material 1a as it is worn away in use. (FIGURE 3 represents the general case.) When $C > A$, the area of the lower surface of application of the body of material tends to decrease with use. When $C < A$, the area of the lower surface of application tends to increase with use.

When $(e_2/e_1) \sec A = \tan A$, then the area of the lower surface of application of the body of erodable material should remain approximately constant in use, or in the cross-dimension of said lower surface if this angle A is not maintained on all sides of the body of material. But for practical simplification in this analysis, it is assumed that this same angle A from the vertical will be maintained for all sides of the body of material, regardless of its configuration in plan view. In this instance, angle C = angle A. Therefore, angle B equals zero and $d = h$.

When $(e_2/e_1) \sec A > \tan A$, then the area of the lower surface of application of the body of erodable material will tend to decrease with use.

When $(e_2/e_1) \sec A < \tan A$, then the area of the lower surface of application will tend to increase with use.

In actuality, $e_2$ appears to be a function of $e_1$. Also, $e_2$ would appear to be affected by the angle A and probably by a configuration factor "F" (an average value) which would also depend on the angle A and on the particular configuration of the side surface, on the size and positioning of the hand when using the article, and also on the particular configuration of the member. Further, the particular habits of use by the person holding the article could affect this factor F.

The effect of angle A on $e_2$ would appear to vary in some relation to sin A, for when $A = 90°$, $e_2$ should equal $e_1$. This might be simply stated—

$$e_2 = F(K + \sin A) e_1$$

where K is a residual component of the erosion rate when $A = 0°$.

It appears that F is not a simple sinusoidal function for when $A = 0°$, $F > 0$ and $F \times K$ is considerably less than unity. And when $A = 90°$, $F(K+1) = 1$. But further analysis tends to become academic as practical values for angle A can be determined readily from the preceding analysis plus empirical tests.

Referring to the preceding analysis, when $A = \arctan (e_2/e_1) \sec. A$ (ref. FIG. 3), by the time the bottom surface erodes a distance equal to maximum $h$, the side surface will have completely eroded away. The body of material will be completely consumed. And what is of special significance is that throughout the entire period of erosion, the lower cooperating surface will remain approximately constant in area.

This is usually desirable for erodable materials, for example soap, because it permits use of the material at approximately the same efficiency throughout the life of the material. Thus, with soap one can lather and wash as efficiently and as quickly with a cake of this design at each and every successive stage of wear. This is so because the speed and efficiency of washing relate directly to the area of the lower, principal cooperating surface of the body of material. This is important to some people, especially when having only a limited time for bathing such as in the morning, when speed of bathing may be of importance. Also, where the attached member comprises a handle, maintaining a principal cooperating surface for the body of material that is of substantial area and cross-dimensions can improve the stability of the article in use, thereby preventing tipping or decreasing the tendency to tip during use. This improves the convenience and usefulness of the article.

FIGURE 4 shows a cake of material $1b$ attached to a member $2b$ similarly as before. Only in this case the material is shown about half eroded away. An angle $A_2$ is chosen here such that the lower surface $3_b$ of application for the body of material $1b$ is approximately the same in cross-dimension as before it was used, shown by the dashed line $3_b'$. At that time, the side surface was designated generally by the dashed line $4_b'$.

The term "member" is here defined as anything which is in any way attached to, fastened to, or bonded to the body of erodable material that reduces or otherwise impedes erosion of said material in the vicinity of said member. Such member may itself be erodable, providing that its rate of erosion be substantially less than that of the major bulk of the body material. Usually, said member would be made of plastic, wood, metal or other suitable material or any of these in combination.

The terminology "taper" and "generally tapered" are defined to include not only an exact taper, such as of the sides $4a$ in cross-section or profile as shown in FIGURE 3, but also an approximate taper and an average taper, such as for side surfaces which may not conform to an exact taper but which for an erodable body of material effectively results in the same approximate pattern of erosion as that of a more exact taper. An example of such an approximate taper is shown in FIGURE 1 and is defined here by angle A even though it might be represented more accurately by a compound or double taper. Where the side surface and the principal or lower surface of application are joined by a generally curved configuration, by definition parts of this generally curved joining surface whose tangent lying in a vertical plane passing through the centermost portion of the body of material forms an acute angle with the vertical in excess of 45 degrees will be considered as being part of the lower surface and not of the side surface while that which forms an acute angle of less than 45° will be considered as part of the side surface. Where this joining surface of the side with the bottom is irregular in configuration due to undulations, a break in curvature, different curvatures and such, the line of intersection of the side and the bottom may be taken as an average location in accordance with the intent of the preceding definition.

It should be clear that the profile of the body of material in plan view may not only be generally circular, but it also may be oval, rectangular or any of a variety of shapes including various polygons, of regular or irregular configuration. The erodable material, as is generally indicated by previous discussion, and especially with reference to its average rates of erosion normal to the principal surface of application and also to the generally tapered side surface, preferably should be of substantially uniform composition, as the bulk of bar soap is, so as to facilitate the practical application of this invention.

The commonly used additives to bar soap, such as emollients, bacteriostats, fragrance and coloring have been found to have little or no effect on the physical wear properties of bar soap. Further, the body of erodable material is here explicitly defined to include only soap, wax (and other similarly plastic, moldable and erodable type materials which are generally soft, or which tend to soften in use, and to which said member may be attached.

Thus, it is seen that when angle $A_1$ is chosen as specified above (in the mathematically demonstrated example) for a body of erodable material having a principal (lower) surface for cooperation with an object being treated, erosion from the opposite surface being impeded or largely prevented by any means such as by an attached member as here shown, said side surface being generally tapered for more than 50% of the vertical height of said body of material, said taper being generally contiguous with the lower surface of application of said material, the area of the lower cooperating surface can be maintained approximately constant throughout most of the useful life of the erodable material by choice of the proper angle $A_1$.

When for the same material an angle $A'$ is chosen larger than the above-described angle $A_1$ (and assuming the same relative rates of erosion), then the area of the lower cooperating surface will tend to increase with erosion of the material. When an angle $A''$ is chosen that is less than angle $A_1$, the area of the lower cooperating surface will tend to decrease with erosion of the body of material. This taper need not be lineal in configuration. For example, if it is desired to increase or decrease the area of the principal cooperating surface at a lineal rate, and assuming that erosion rates $e_1$ and $e_2$ remain constant, then the profile of this "approximate taper" would normally be convex. In such a case, this convexity would usually be moderate, with a continually increased radius of curvature of the side surface with increasing distance along this surface measured upwardly from the generally horizontal plane of intersection of the side surface with the bottom surface. The exact profile chosen may depend on the desired erosion pattern as well as such external factors as improved gripping and appearance and method of production. But the advantage in utilizing a basic taper or approximate taper may be realized all the same.

Thus, an effective means to control the area of the lower cooperating surface of a body of erodable material with attached member, as described, is provided by the combination of a generally tapered side surface or side-profile of said body of erodable material with an angle "A," which is substantially greater than zero degrees. The divergence of the opposite sides forming this taper or approximate taper should be considered as extending generally from the vicinity of their intersection with the lower cooperating surface upwardly at least to the uppermost part of the widest portion of said body and preferably, for best advantage, include within said tapered portion of the body sixty percent or more of the volume of said body of erodable material lying above the horizonal plane of said intersection of the side surface with the lower cooperating surface. For some configurations, the effective side taper may extend upwardly, above the widest portion of said body (e.g. see FIGURE 1), some practical judgment being needed to determine its "effective" uppermost location. In addition, for practical advantage to be gained, the effective vertical height of the body of material should not be less than 22½% of the maximum cross-dimension of said body.

I claim:
1. In combination, a body of erodable material of substantially uniform composition of a size to be grasped by a hand, said body having an upper surface portion, a separate member extending over and attached to at least part of said upper surface portion, said member being of sufficient cross-dimension to substantially impede erosion of the upper surface of said body of material to thereby prevent the said surface being used as a principal surface of application of said body of material, said member including a holding means for holding by the hand, said body having one principal lower surface for application to an object to be treated, said body having side surfaces converging substantially inwardly toward said lower surface in the general configuration of a taper, wherein the effective vertical height of the body of material is not less than 22½% of the maximum cross-dimension of said body, and wherein the volume of the body of material contained within the downwardly tapered portion of said body, measured from the horizontal plane of intersection of the generally tapered side surface with the lower prin- cipal cooperating surface upwardly to a parallel plane that intersects with the widest part of the effective side taper of the body is not less than sixty percent of the total volume of said body of material located upwardly from said horizontal plane of intersection of the generally tapered side surface with the lower principal cooperating surface.

2. In combination, a body of soap of a size to be grasped by a hand, said body having an upper surface portion, a separate member extending over and attached to at least part of said upper surface portion, said member being of sufficient cross-dimension to substantially impede erosion of the upper surface of said body of soap to thereby prevent the said surface being used as a principal surface of application of said body of soap, said member including a holding means for holding by the hand, said body having one principal lower surface for application to an object to be treated, said body having side surfaces converging substantially inwardly toward said lower surface in the general configuration of a taper, wherein the effective vertical height of the body of soap is not less than 22½% of the maxium cross-dimension of said body, and wherein the volume of the body of material contained within the downwardly tapered portion of said body, measured from the horizontal plane of intersection of the generally tapered side surface with the lower principal cooperating surface upwardly to a parallel plane that intersects with the widest part of the effective side taper of the body is not less than sixty percent of the total volume of said body of soap located upwardly from said surface with the lower principal cooperating surface.

3. In combination, a body of erodable material of substantially uniform composition of a size to be grasped by a hand, said body having an upper surface portion, a separate member extending over and attached to at least part of said upper surface portion, said member being of sufficient cross-dimension to substantially impede erosion of the upper surface of said body of material to thereby prevent the said surface being used as a principal surface of application of said body of material said member including a holding means for holding by the hand, said body having one principal lower surface for application to an object to be treated, said body having side surfaces converging substantially inwardly toward said lower surface in the general configuration of a taper, wherein the effective vertical height of the body of material is not less than 22½% of the maximum cross-dimension of said body, and wherein the volume of the body of material contained within the downwardly tapered portion of said body, measured from the horizontal plane of intersection of the generally tapered side surface with the lower principal cooperating surface upwardly to a parallel plane that intersects with the widest part of the effective side taper of the body is not less than sixty percent of the total volume of said body of material located upwardly from said horizontal plane of intersection of the generally tapered side surface with the lower principal cooperating surface, wherein the general taper of the side surface is at such an angle from the vertical that the area of the lower principal cooperating surface of the body of material remains approximately constant throughout the major portion of the life of said body.

4. In combination, a body of soap of a size to be grasped by a hand, said body having an upper surface portion, a separate member extending over and attached to at least part of said upper surface portion, said member being of sufficient cross-dimension to substantially impede erosion of the upper surface of said body of soap to thereby prevent the said surface being used as a principal surface of application of said body of soap, said member including a holding means for holding by the hand, said body having one principal lower surface for application to an object to be treated, said body having side surfaces converging substantially inwardly toward said lower surface in the general configuration of a taper, wherein the effective vertical height of the body of soap is not less than 22½% of the maximum cross-dimension of said body, and wherein the volume of the body contained within the downwardly tapered portion of said body, measured from the horizontal plane of intersection of the generally tapered side surface with the lower principal cooperating surface upwardly to a parallel plane that intersects with the widest part of the effective side taper of the body is not less than sixty percent of the total volume of said body of soap located upwardly from said horizontal plane of intersection of the generally tapered side surface with the lower principal cooperating surface, wherein the general taper of the side surface is at such an angle from the vertical that the area of the lower principal cooperating surface of the body of soap remains approximately constant throughout the major portion of the life of said body.

5. In combination, a body of erodable material of substantially uniform composition of a size to be grasped by a hand, said body having an upper surface portion, a separate member extending over and attached to at least part of said upper surface portion, said member being of sufficient cross-dimension to substantially impede erosion of the upper surface of said body of material to thereby prevent the said surface being used as a principal surface of application of said body of material, said member including a holding means for holding by the hand, said body having one principal lower surface for application to an object to be treated, said body having side surfaces converging substantially inwardly toward said lower surface in the general configuration of a taper, wherein the effective vertical height of the body of material is not less than 22½% of the maximum cross-dimension of said body, and wherein the volume of the body of material contained within the downwardly tapered portion of said body, measured from the horizontal plane of intersection of the generally tapered side surface with the lower principal cooperating surface upwardly to a parallel plane that intersects with the widest part of the effective side taper of the body is not less than sixty percent of the total volume of said body of material located upwardly from said horizontal plane of intersection of the generally tapered side surface with the lower principal cooperating surface, wherein the angle C is described as the angle included between the general taper of the side surface before use of the combination and the average profile of the path of a point located on the outer edge of the principal surface of application throughout the eroding away of the body of material, as described by the following two equations:

$$C = A + \arctan\left[(e_2/e_1) \sec A - \tan A\right]$$

where $$(e_2/e_1) \sec A = \tan A$$

6. In combination, a body of soap of a size to be grasped by a hand, said body having an upper surface portion, a separate member extending over and attached to at least part of said upper surface portion, said member being of sufficient cross-dimension to substantially impede erosion of the upper surface of said body of soap to thereby prevent the said surface being used as a principal surface of application of said body of soap, said member including a holding means for holding by the hand, said body having one principal lower surface for application to an object to be treated, said body having side surfaces converging substantially inwardly toward said lower surface in the general configuration of a taper, wherein the effective vertical height of the body of soap is not less than 22½% of the maximum cross-dimension of said body, and wherein the volume of the body of material contained within the downwardly tapered portion of said body, measured from the horizontal plane of intersection of the generally tapered side surface with the lower principal cooperating surface upwardly to a parallel plane that intersects with the widest part of the effective side taper of the body is not less than sixty percent of the total volume of said body of soap located upwardly from said horizontal plane of intersection of the generally tapered side surface with the lower principal cooperating surface, wherein the angle C is described as the angle included between the general taper of the side surface before use of the combination and the average profile of the path of a point located on the outer edge of the principal surface of application throughout the eroding away of the body of material, as described by the following two equations:

$$C = A + \arctan[(e_2/e_1) \sec A - \tan A]$$

where $$(e_2/e_1) \sec A = \tan A$$

References Cited by the Examiner

UNITED STATES PATENTS

| | | | |
|---|---|---|---|
| 3,100,383 | 8/1963 | Staver | 45—28 |
| 3,125,824 | 3/1964 | Staver | 45—28 |

FOREIGN PATENTS

| | | |
|---|---|---|
| 567,780 | 3/1924 | France. |
| 1,058,379 | 11/1953 | France. |

MORRIS KAPLAN, *Primary Examiner.*

T. B. SHERRY, *Examiner.*

C. A. NUNBERG, *Assistant Examiner.*